United States Patent [19]

Pfalzgraf et al.

[11] Patent Number: 5,133,629
[45] Date of Patent: Jul. 28, 1992

[54] TOOL HOLDING ASSEMBLY PROVIDED WITH A FEELER DEVICE

[75] Inventors: Emile Pfalzgraf, Bouxwiller; Claude Jaeger, Monswiller; Philippe Laidet; Joseph Medard, both of Toulouse; Francis Tremolet, Toulouse, all of France

[73] Assignees: E.P.B. Emile Pfalzgraf S.A., Bouxwiller; Aerospatiale, Societe Nationale Industrielle, Societe Anonyme, Paris, both of France

[21] Appl. No.: 638,456

[22] Filed: Jan. 7, 1991

[30] Foreign Application Priority Data

Jan. 5, 1990 [FR] France .................. 90 00196

[51] Int. Cl.⁵ .................. B23C 5/28; B23Q 11/10; B23B 49/00
[52] U.S. Cl. .................. 409/232; 408/56; 408/95; 409/136
[58] Field of Search ........... 409/232, 137, 136, 234, 409/231, 135; 408/95, 97, 99, 59, 56; 10/129 R

[56] References Cited

U.S. PATENT DOCUMENTS

| | | | |
|---|---|---|---|
| 2,884,819 | 5/1959 | Roubloff | 10/129 R |
| 3,637,318 | 1/1972 | Hayes | 408/97 X |
| 4,037,982 | 7/1977 | Clement | 409/137 |
| 4,717,291 | 1/1988 | Zafir | 408/99 X |
| 4,795,293 | 1/1989 | Mizoguchi | 409/136 |
| 4,818,159 | 4/1989 | Mizoguchi | 408/59 X |
| 4,915,550 | 4/1990 | Arai | 408/95 X |
| 4,917,547 | 4/1990 | Frederickson | 409/136 X |

FOREIGN PATENT DOCUMENTS

| | | | |
|---|---|---|---|
| 2586957 | 3/1987 | France . | |
| 2628351 | 9/1989 | France . | |
| 300807 | 12/1988 | Japan | 408/56 |
| 1426749 | 9/1988 | U.S.S.R. | 408/56 |

*Primary Examiner*—William Briggs
*Attorney, Agent, or Firm*—Young & Thompson

[57] ABSTRACT

A tool holder assembly, having a central tool holding shaft (1) provided, on the one hand, with a mounting cone for securement in a machine tool spindle and, on the other hand, on the side opposite the cone, with an intermediate cylindrical body provided at its forward portion with securement structure for a tool. It is provided also with a feeler device (2) centered on the central shaft (1) and guided in translation on this latter, with lubricating structure and with cleaning structure for the machining region at the location of application of the feeler device (2).

7 Claims, 2 Drawing Sheets

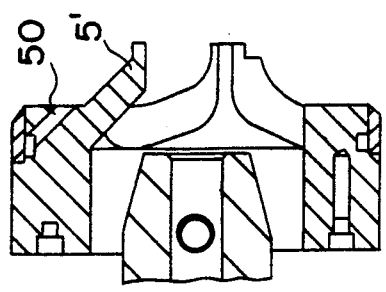
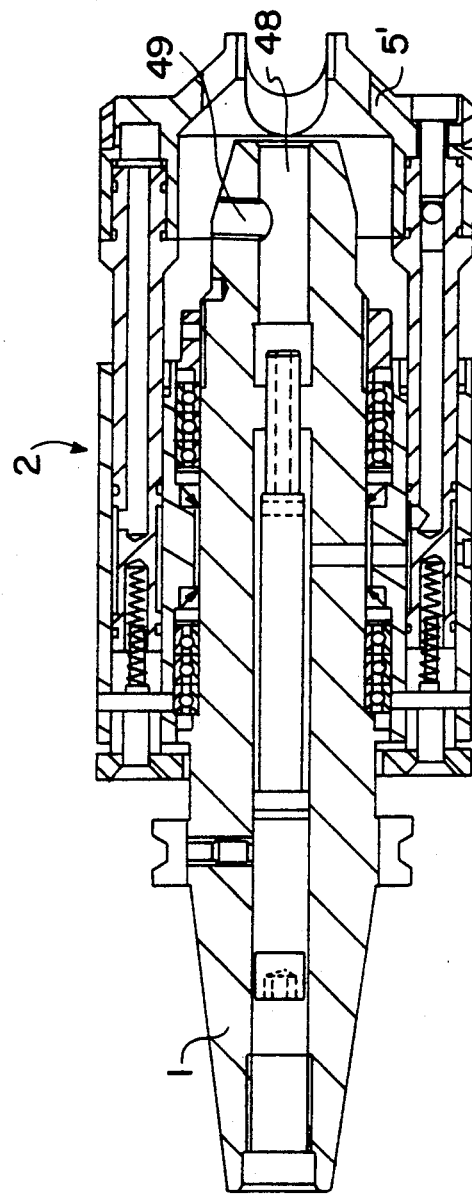
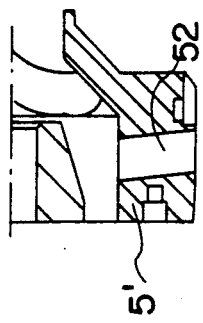
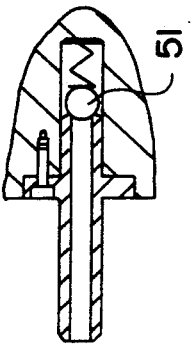

TOOL HOLDING ASSEMBLY PROVIDED WITH A FEELER DEVICE

FIELD OF THE INVENTION

The present invention relates to the field of machine tool accessories, particularly machines especially adapted for particular machining operations such as the provision of holes, bores and milled regions that are extremely precise in depth in all types of surfaces, namely straight, curved or convex, to permit emplacing in these machined recesses securement rivets, more particularly in the field of aeronautic and aerospace construction.

BACKGROUND OF THE INVENTION

A milling operation using automatic machines requires immediate stopping of said machines as soon as the required depth of milling is achieved relative to the surface of the piece to be machined. This depth must be very exactly observed so that, during mounting of the rivets and the securement of the latter in holes and milled recesses of the machined piece, no rivet will extend above or below the surface of the piece, which would give rise to undesirable aerodynamic turbulence over the assembly of the pieces.

SUMMARY OF THE INVENTION

The present invention has for its object to provide a tool holding assembly adapted to ensure extremely precise and repetitive machining.

Thus, according to the invention, the tool holding assembly, which is essentially constituted by a central tool holding shaft provided, on the one hand, with a mounting cone for securement on a machine tool spindle and, on the other hand, on the side opposite to the cone, with an intermediate cylindrical body provided in its forward portion with securement means for a tool, is also provided with a feeler device centered on the central shaft and guided in translation on this latter, with lubrication means, and with cleaning means of the site of the machining, in the region contacted by the feeler device.

BRIEF DESCRIPTION OF THE DRAWINGS

The invention will be better understood from the following description, which relates to a preferred embodiment, given by way of non-limiting example, and explained with reference to the accompanying schematic drawing, in which:

FIG. 7 is a view similar to that of FIG. 1 of a modified embodiment of the tool holder assembly;

FIG. 8 is a view partially in section of the feeler cover of the assembly of FIG. 7, shifted relative to this latter;

FIG. 9 is a partial cross-sectional view of the lubricant feed connection, and

FIG. 10 is a half view analogous to that of FIG. 8 showing the feeler cover in a position shifted from those of FIGS. 7 and 8.

DESCRIPTION OF THE PREFERRED EMBODIMENTS

Figure 3:
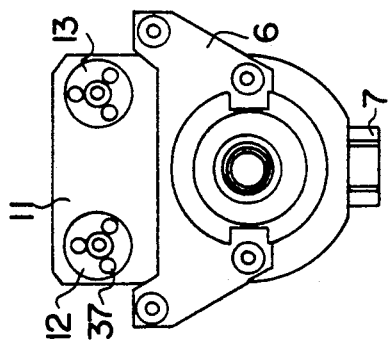
FIG. 3 is a rear elevational view of the tool holder assembly.

According to the invention and as shown more particularly by way of example in FIGS. 1 to 4 of the accompanying drawings, the tool holder assembly which is essentially constituted by a central tool holder shaft 1 provided, on the one hand, with a mounting cone for securement of a machine tool spindle and, on the other hand, at the side opposite the cone, a cylindrical intermediate body provided at its forward portion with securement means for a tool, is provided also with a feeler device 2 centered on the central shaft 1 and guided in translation on this latter, with lubrication means, and with cleaning means for the machining region at the site of application of the feeler device 2.

The central tool holder shaft 1 has at its rear portion a standardized cone prolonged forwardly by an intermediate cylindrical body terminating in means for securing a tool such as a reamer, a drill bit, etc., and is also provided with an axial screw 22 for adjusting the position of the tool lengthwise. The securement means can be in known manner a clamp carrier 23 with clamps and a nut screwed on the forward portion of the central shaft 1, or else a device for securement with a cylindrical bore of the Weldon or Whistle-Notch type system, or any other securement means.

The feeler device 2 is constituted by a cylindrical body 3 centered on the central tool holder shaft 1 by means of rollers 4 protected outwardly of the body 3 by sealing rings 33 and bearing against shoulders of said body 3 by means of intermediate members 35, sealing joints 36 providing sealing toward the interior of the body 3, which is blocked in translation on said shaft 1 by means of a nut 21 itself blocked in position by a flat ended screw 24, by a feeler cover 5 extending over the forward portion of the tool holder assembly concentrically with the tool, by an abutment carrying plate 6 connected to the cylindrical body 3 on its side facing the cone of the central shaft 1 and by an indexing support 7 located on the body 3 by means of a pin 8, secured to said body 3 by means of a screw 9 and carrying an indexing device 10 such as a small electronic unit or the like. The rings 33 are adapted to avoid any penetration of dirt from the exterior toward rollers 4.

Figure 5:
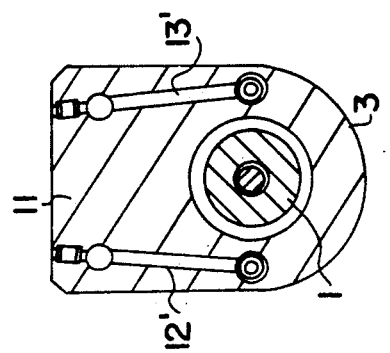
FIG. 5 is a cross-sectional view on line A—A of FIG. 2.

At its rear end carrying the plate 6, the cylindrical body 3 has an eccentric portion 11 carrying an air supply connection 12 and a water supply connection 13 (FIG. 3) secured by means of screws 37 and connected by respective passages 12' and 13' (FIG. 5), to corresponding air and water supply pipes 14 and 15, respectively, mounted displaceably in translation in the cylindrical body 3 against the action of springs 16 guided on lugs 17 bearing on diametrically opposite pins 18 disposed in the body 3 and coacting, to guide and limit displacement of the pipes 14 and 15, with orifices provided in the ends of these pipes 14 and 15, the sealing of the mounting of the pipes 14 and 15 in the cylindrical body 3 being ensured by O-rings 19 secured by means of plugs 20 and said pipes 14 and 15 carrying at their opposite site the feeler cover 5.

Figure 6:
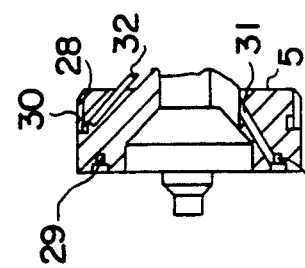
FIG. 6 is a cross-sectional view on line B—B of FIG. 4.
Figure 2:
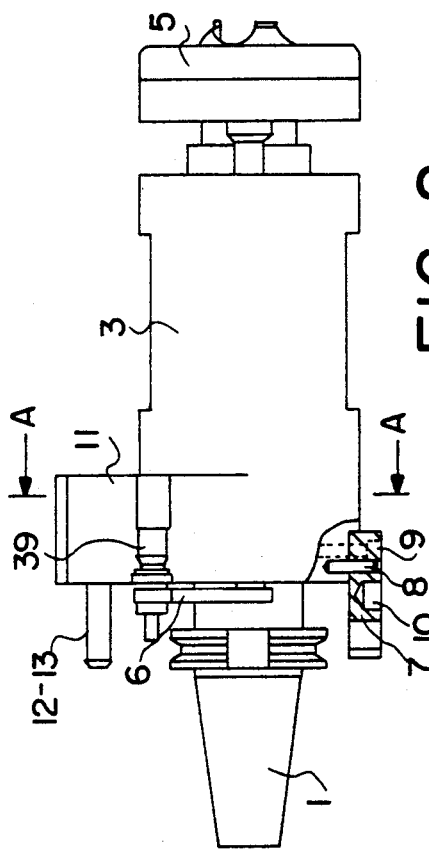
FIG. 2 is a side elevational view partly in section of the tool holder assembly of FIG. 1.

The feeler cover 5 is secured on the one hand to the water inlet pipe 15 by means of a screw 25 and to the air inlet pipe 14 by means of two set screws 26 and the respective conduits for the passage of water and air of said pipes 15 and 14 are connected to corresponding annular chambers 27 and 28 defined in said cover 5, on the one hand, by a disc ring in two segments 29 and, on the other hand, by an external closure ring 30, said chambers 27 and 28 opening respectively at the forward end of the internal portion of the cover 5 and on the forward suface of this latter by means of diagonal channels 31 and air entrance nozzles 32 (FIG. 6).

The plate 6 is, on the one hand, secured to the air and water supply pipes 14 and 15 by means of a conical head screw 38 in the end of said pipes comprising the openings for passage of the pins 18, to the rear of these openings and, on the other hand, provided with at least one and preferably two micrometric abutments 39 adapted to coact with corresponding micro-contacts provided on the frame of the shaft of the machine tool. The micrometric abutments 39 are in known manner provided in the form of rods provided with a micrometric screw-threaded end entering a corresponding tapped portion secured to the tool carrying plate 6 and adapted to be fixed in adjusted position by means of a set screw.

Of course, a single micrometric abutment will suffice to stop the machine upon reaching the end of a predetermined machining pass, the second abutment being provided only to ensure better certainty of operation.

Figure 1:
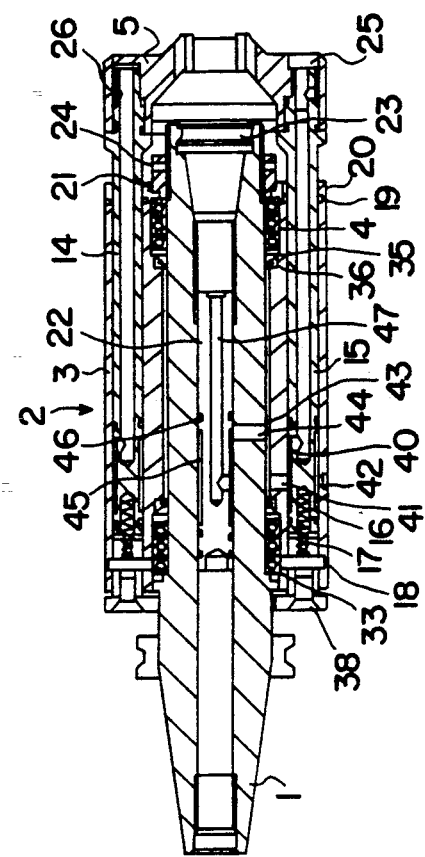
FIG. 1 is a plan and cross-sectional view of a tool holder assembly according to the invention.
Figure 4:
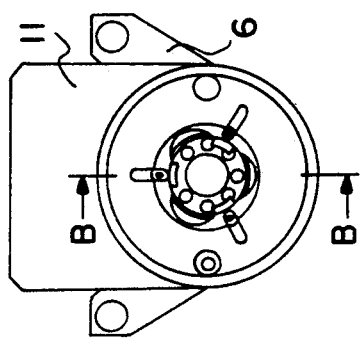
FIG. 4 is a front elevational view of the tool holder assembly.

The water inlet conduit of the water supply pipe 15 is connected moreover by means of an annular chamber 40, defined on the external surface of said pipe 15, and a channel 41 passing through body 3 at the level of said chamber 14 and closed outwardly by a plug 42, to an annular chamber 43 defined between the sealing joints 36, the internal surface of body 3 and the external surface of the intermediate cylindrical body prolonging the central shaft 1 forwardly, said chamber 43 itself opening by means of a through hole 44 into the annular chamber 45, machined on the body of the axial screw 22 and defined by the sealing joints 46, said chamber 45 being connected by a radial blind hole to an axial blind hole 47 opening on the forward securement surface of the tool. Thus, it is possible to provide central lubrication in the case of use of tools with an oil hole, the peripheral lubrication being adapted to be prevented by use of a longer screw 25 and peripheral lubrication by a mounting such as shown in FIG. 1.

Of course, it is equally possible to provide both central lubrication and peripheral lubrication.

Moreover, in a manner known per se, the roller sets 4 ensuring guiding in rotation of the shaft 1 in the feeler device 2 are advantageously lubricated by grease by means of greasers not shown in the drawings.

FIGS. 7 to 9 of the accompanying drawings show modified embodiments of the invention.

FIG. 7 is a plan and cross-sectional view, on a larger scale, analogous to that of FIG. 1, in which the central shaft 1 is provided with a bore 48 for mounting the tail of the tool which is gripped by means of a screw coacting with an inclined flat on said tail and extending into a tapped hole 49 inclined at 4° relative to the perpendicular to the axis of the tool and accessible through a hole 52 (FIG. 10) provided for this purpose in the wall of the feeler cover 5' which has larger clearance about the tool, as well as direct outlet channels 50 for cleaning air (FIG. 8). The greater clearance of the feeler cover 5' permits better evacuation of cuttings and the provision of channels 50 for direct outlet of air permits avoiding the use of small complementary tubes.

Finally, FIG. 9 of the accompanying drawings shows a modified embodiment of mounting of the connection 13 for the feed of lubricating water, which is preferably provided with a non-return valve 51.

The device according to the invention operates in the following manner:

The manipulator arm of the machine is provided at a very specific location with a centering finger adapted to coact with the indexing support 7 to index the tool holder assembly according to the invention in a fixed position. This indexing is necessary for automatically changing the tool holder assembly between the spindle and the transport into the tool magazine. This is particularly possible because the spindle is also stopped in a very precise position. Thus, upon stopping the spindle the tool carrier assembly will always confront the indexing on the spindle support and will be maintained in position on the spindle with the feed connections 12 and 13.

During machining, the machine support, including the spindle, will displace axially in the direction of the piece to be machined, only the central tool carrying shaft 1 being in rotation during the machining operations and serving thanks to the rollers 4, as a joint turning for lubrication, the feeler device with all its accessories remaining fixed in rotation, because the feed connections 12 and 13 are engaged in the fixed support provided on the spindle support.

In apparatus 2, only the axial movement of the two pipes 14 and 15, as well as the feeler cover 5 and the abutment carrying plate 6 with two micrometric abutments 39 is possible.

At the beginning of machining, the tool carrying assembly mounted in the spindle of the machine will occupy the position shown in FIG. 1, the feeler cover 5 being in advanced position under the action of springs 17, the central tool being secured in the shaft 1 by a clamping mandrel or in a securement system of the Whistle-Notch type, with a preadjusted amount of overhang to effect the required depth of milling. The cutting tool will then be adjusted by means of the axial screw 22, such that at the time of disengagement the path of the pipes 14 and 15 for maintaining the feeler in the body 3 of the feeler device will be equal to half or two-thirds of the maximum possible path. When the desired depth is achieved after application of the forward surface of the feeler cover 5, the two micrometric abutments are adjusted so as to release the corresponding micro-contacts, which are adapted to reverse the axial movement of the support and spindle assembly of the machine.

The machine tools used for such machining are provided with a universal spindle head programmed so as to be able to follow all the shapes of the pieces to be machined, such that said head always has its axis perpendicular to the piece. After adjusting the tool holder assembly, the distance from the piece to the spindle can vary without influencing the depth of milling which will always be closely identical thanks to the micrometric abutments 39 and to the return control of the spindle by the corresponding micro-contacts. In known manner, the supply of air and water is programmed relative to the machining stage and the air jets which are pulsed against the front of the feeler cover 5 are adapted to clean the machining region before applying said feeler cover to the piece to be machined, so as to avoid any interposition of cuttings or the like between the surface of the cover and the piece, which would result in a failure to maintain machining depth.

Thanks to the invention, it is possible to provide a tool carrier assembly permitting the performance of particularly precise repetitive machining operations, especially in the field of aeronautic and aerospace construction.

Of course, the invention is not limited to the embodiment shown and described in the accompanying drawings. Modifications remain possible, particularly as to the construction of the various elements or by substitution of technical equivalents, without thereby departing from the scope of protection of the invention.

What is claimed is:

1. Tool holder assembly, comprising a central tool holding shaft (1) provided, on the one hand, with a mounting cone for securement in a machine tool spindle and, on the other hand, on the side opposite the cone, with an intermediate cylindrical body provided at its forward portion with securement means for a tool, and having also a feeler device (2) centered on the central shaft (1), said feeler device being movable relative to the central shaft lengthwise of the central shaft upon the advance of the central shaft toward a workpiece while the feeler device remains stationary in contact with the workpiece, means responsive to a preselected amount of movement of the feeler device relative to the central shaft to stop said advance of the central shaft, and cleaning means for the machining region at the point of application of the feeler device (2), said feeler device (2) being a cylindrical body (3) centered on the central tool holder shaft (1) by means of rollers (4), protected externally of the body (3) by sealing rings (33) and bearing against shoulders of said body (3) by means of intermediate members (35), sealing joints (36) assuring sealing of the interior of the body (3), which is blocked in translation on said shaft (1) by means of a screw (21) itself blocked in position by a flat-end screw (24), by a feeler cover (5) extending on the forward portion of the tool holder assembly concentric with the tool, by an abutment carrying plate (6) connected to the cylindrical body (3) on its side toward the cone of the central shaft (1) and by an indexing support (7) located on the body (3) by means of a pin (8), secured on said body (3) by means of a screw (9) and carrying a coding device (10), such as a small electronic unit.

2. Assembly according to claim 1, wherein the feeler cover has a larger clearance about the tool, said assembly further includes direct outlet channels (50) for cleaning air and is provided in a wall of said feeler cover with a hole (52) giving access to a tapped hole (49), inclined at 4° relative to the perpendicular to the axis of the tool and provided for receiving a set screw for securing the tool in a bore (48) of the central shaft (1).

3. Assembly according to claim 1, wherein at its rear end carrying the abutment carrying plate (6), the cylindrical body (3) has an eccentric portion (11) carrying a feed connection for air (12) and a feed connection for supplying lubricating water (13) secured by means of screws (37) and connected via respective channels (12' and 13'), to corresponding air supply and water supply pipes (14, 15) mounted movably in translation in the cylindrical body (3) against the action of springs (16) guided on lugs (17) bearing against diametrically opposed pins (18) disposed in the body (3) and coacting, for the guidance and limitation of displacement of the pipes (14 and 15), with openings provided in the ends of these pipes (14 and 15), the sealing of the mounting of the pipes (14 and 15) in the cylindrical body (3) being ensured by O-rings (19) secured by means of plugs (20) and said pipes (14 and 15) carrying at their opposite end the feeler cover (5).

4. Assembly according to claim 3, wherein the feeler cover (5) is secured, on the one hand, to the water supply pipe (15) by means of a screw (25) and to the air supply pipe (14) by means of two pointed screws (26) and the respective inlet conduits for water and air of said pipes (15 and 14) are connected to corresponding annular chambers (27 and 28) defined in said cover (5), on the one hand, by means a flat ring (29) in two segments and, on the other hand, by an external closure ring (30), said chambers (27 and 28) opening respectively in front of the internal portion of the cover (5) and on the forward surface of this latter through oblique channels (31) and air inlet nozzles (32).

5. Assembly according to claim 3, wherein the abutment carrying plate (6) is, on the one hand, secured to the air supply pipe (14) and the water supply pipe (15) by means of a conical headed screw (38) extending into the end of said pipes comprising openings for the passage of the pins (18), to the rear of these openings and, on the other hand, provided with at least one and preferably two micrometric abutments (39) adapted to coact with the corresponding microcontacts provided on the support of the machine tool spindle.

6. Assembly according to claim 3, wherein the water inlet conduit of the water supply pipe (15) is connected moreover by means of a first annular chamber (40), defined on the external surface of said pipe (15), and a channel (41) passing through the body (3) at the region of said first chamber (40) and externally closed by a plug (42), to a second annular chamber (43) defined between the sealing joints (36), the internal surface of the body (3) and the external surface of the intermediate cylindrical body prolonging the central shaft (1) forwardly, said second chamber (43) opening itself through a through passage (44) into a third annular chamber (45) machined on the body of the axial screw (22) and defined by sealing joints (46), said third chamber (45) being connected by a blind radial bore to a blind axial bore (47) opening on the forward securement surface of the tool.

7. Assembly according to claim 3, wherein the connection (13) for the supply of lubricating water is provided with a non-return valve (51).

* * * * *